April 10, 1951  L. D. WHITTLESEY ET AL  2,548,277
CUTTER GRINDING MACHINE
Filed June 9, 1948  5 Sheets-Sheet 5
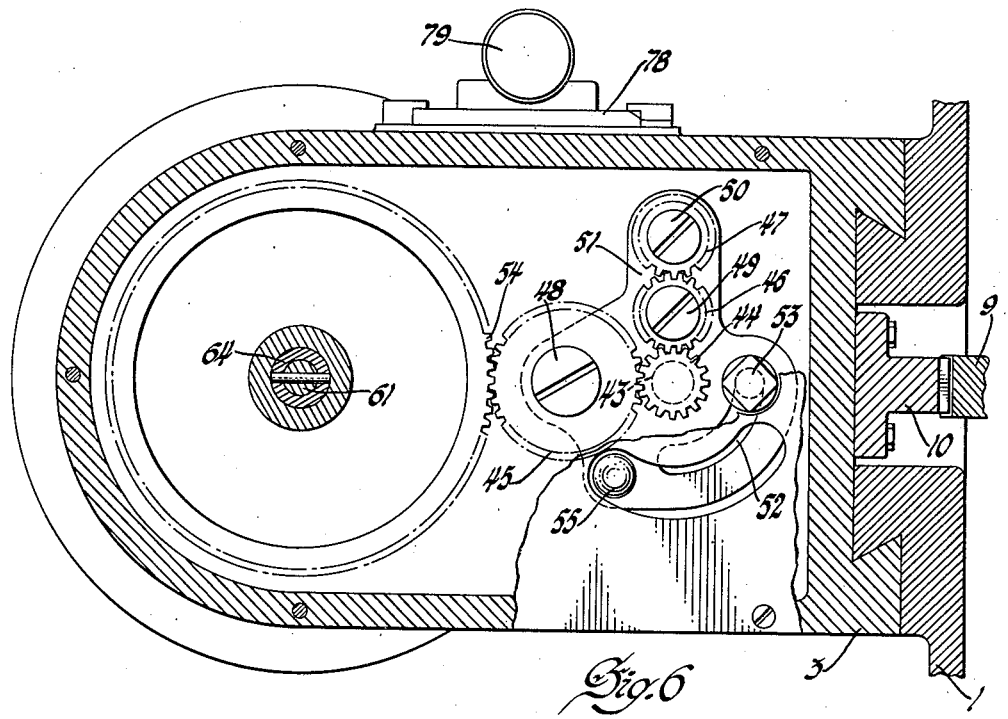
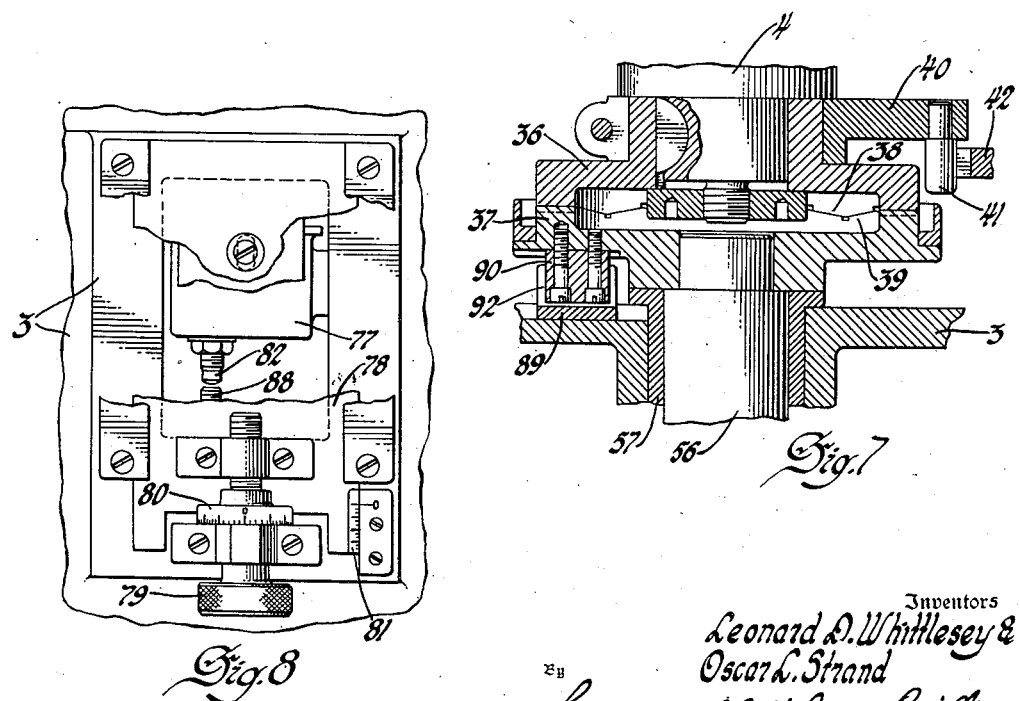
Inventors
Leonard D. Whittlesey &
Oscar L. Strand
By
Spencer, Willits, Helsing & Baillie
Attorneys Patented Apr. 10, 1951

2,548,277

UNITED STATES PATENT OFFICE 2,548,277

CUTTER GRINDING MACHINE

Leonard D. Whittlesey, Flint, and Oscar L. Strand, Mount Morris, Mich., assignors to General Motors Corporation, Detroit, Mich., a corporation of Delaware Application June 9, 1948, Serial No. 31,896

13 Claims. (Cl. 51—123)

This invention relates to grinding machines and particularly to a machine for grinding and sharpening the teeth of circular milling cutters.

In modern high speed production milling operations under close work tolerances it is necessary that the run-out or variation in height of cutting edge between the different teeth be the least possible and that the cutting surfaces be frequently resharpened. Such resharpening has in the past been done on grinding machines which, while primarily designed for the purpose, are inherently inaccurate and slow operating, and further require the constant attendance of an operator of considerably more than average machining skill. In such conventional machines the cutter is locked in fixed position on an index head and the grinding wheel moved manually across one tooth cutting surface, after which the grinding wheel is backed away and the cutter manually rotated or indexed to position the next tooth opposite the wheel, and so on until all the teeth have received the same grind, at which time either the cutter or the wheel is manually advanced a selected amount and the operation repeated for a second cut. Its disadvantages are that much operating time is lost during indexing, and that, because the rate at which the grinding wheel is moved across a particular tooth has considerable effect on the depth of stock removed therefrom, variations in the speed of strokes for different cutter teeth result in an unsatisfactorily high cutter run-out. Further, the amount which the cutter is fed or advanced for successive cuts much be carefully selected each time to avoid chipping the cutter tooth material, etc.

Accordingly, the principal object of this invention is to provide a machine particularly adapted for grinding the teeth of circular milling cutters and the like, which obtains: continuous rotation of the cutter during grinding, thereby eliminating indexing time; automatic feed of the cutter against the grinding wheel at a predetermined rate wtih each revolution of the cutter; simultaneous grinding of both the face and chamfer of the cutting teeth; grinding wheel sweep from the cutting edge towards the back of the tooth, thereby eliminating chipping of the cutting edge; and uniformity of stock removal to obtain minimum tooth run-out.

Other objects and advantages inherent in the machine will become evident from a reading of the following specification in connection with the drawings illustrating a specific embodiment thereof, and in which:

Figure 5 is a fragmentary plan view taken on line 5—5 of Figure 3, with parts broken away and in section.

Figure 6 is an enlarged bottom plan view taken on line 6—6 of Figure 3, with parts broken away and in section.

Figure 7 is an enlarged fragmentary view similar to Figure 3, certain parts shown therein in elevation being here shown broken away and in section.

Figure 8 is an enlarged fragmentary elevational view taken from line 8—8 of Figure 1, with parts broken away to expose other parts to view.

Figure 1:
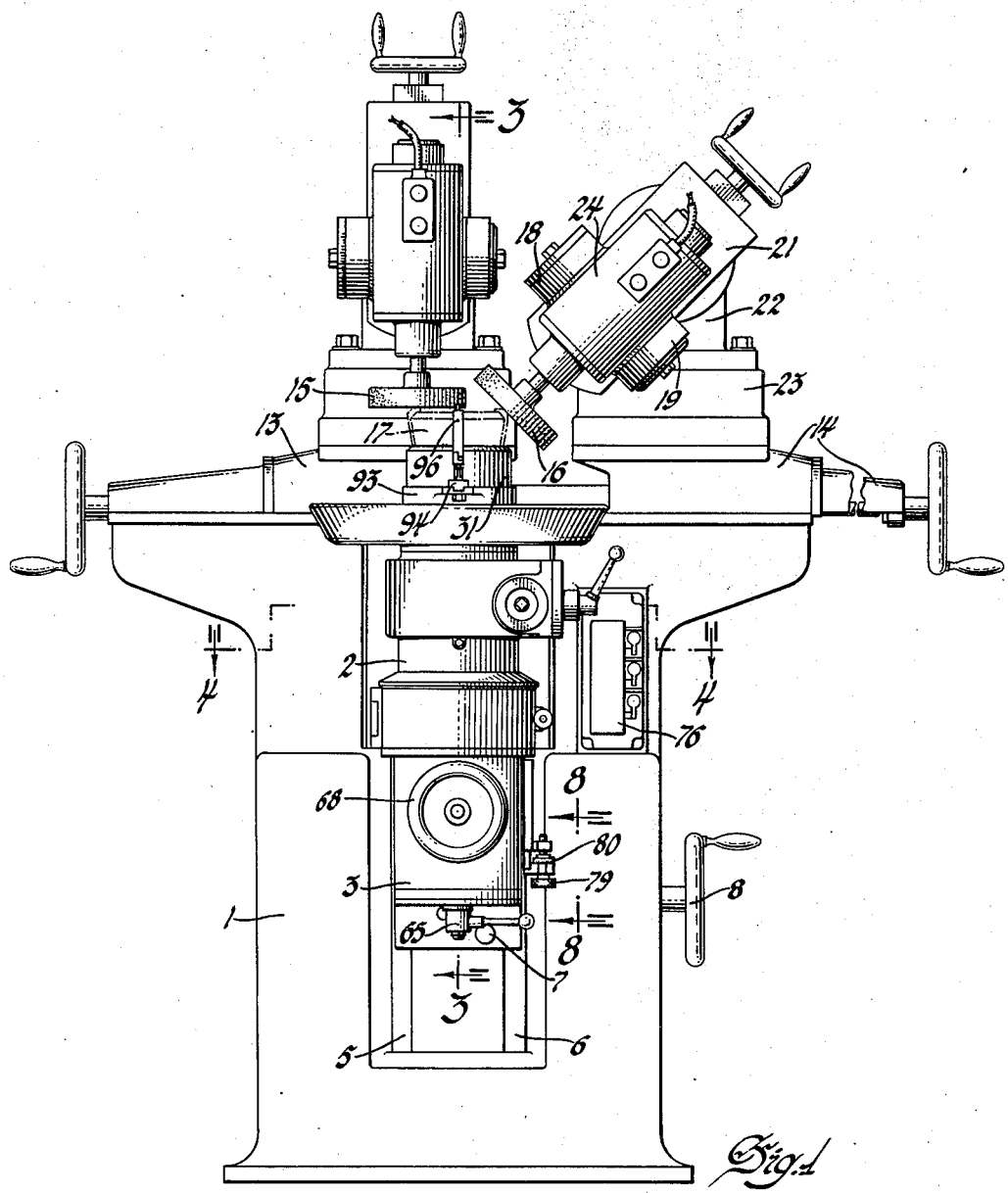
Figure 1 is a front elevational view of a machine embodying the invention.

The machine as shown in the drawings comprises a hollow frame structure or base 1, on one side of which are mounted upper and lower housings 2 and 3. The upper housing 2 is fixedly secured (by means not shown) to the base 1 and supports a rotating and longitudinally reciprocating vertical work arbor or spindle 4. The lower housing 3 carries the spindle reciprocating and feed mechanism and is mounted on vertical ways 5 and 6, on which it may be locked in position directly under the upper housing 2, as shown, by means of the sliding bolt 7, or lowered out of operative position by rotating the hand wheel 8 which rotates the pinion 9 in mesh with the rack 10 carried by the lower housing 3. To facilitate raising and lowering of the lower housing 3 it may be counterbalanced by a weight 98 located within the enclosure provided by the hollow machine base 1 and connected to the lower housing 3 by a cable 99 running over sheaves 100 and 101 mounted to the base 1 and upper housing 2, respectively.

Mounted adjacent each other on the top of the frame on horizontal ways 11 and 12 are two tool slides 13 and 14 carrying motor driven grinding wheels 15 and 16 in position to grind the face and chamfered ends, respectively, of the teeth of the milling cutter indicated in outline by the numeral 17. The particular arrangement by which the grinding wheels are supported from the machine base 1 may be altered from that shown in the drawings without departing from the essence of the invention. As shown, the grinding wheel 16 is directly driven from the shaft of the motor 24 which is angularly adjustable between arms 18 and 19 of a yoke 20 which in turn is slidably adjustable along a rail member 21. The latter is angularly adjustable in a bracket 22 secured to a slide 23 which is slidably adjustable on ways extending transversely of the slide 14. The apparatus shown for mounting the grinding wheel 15 is identical to that described for wheel 16.

Figure 3:
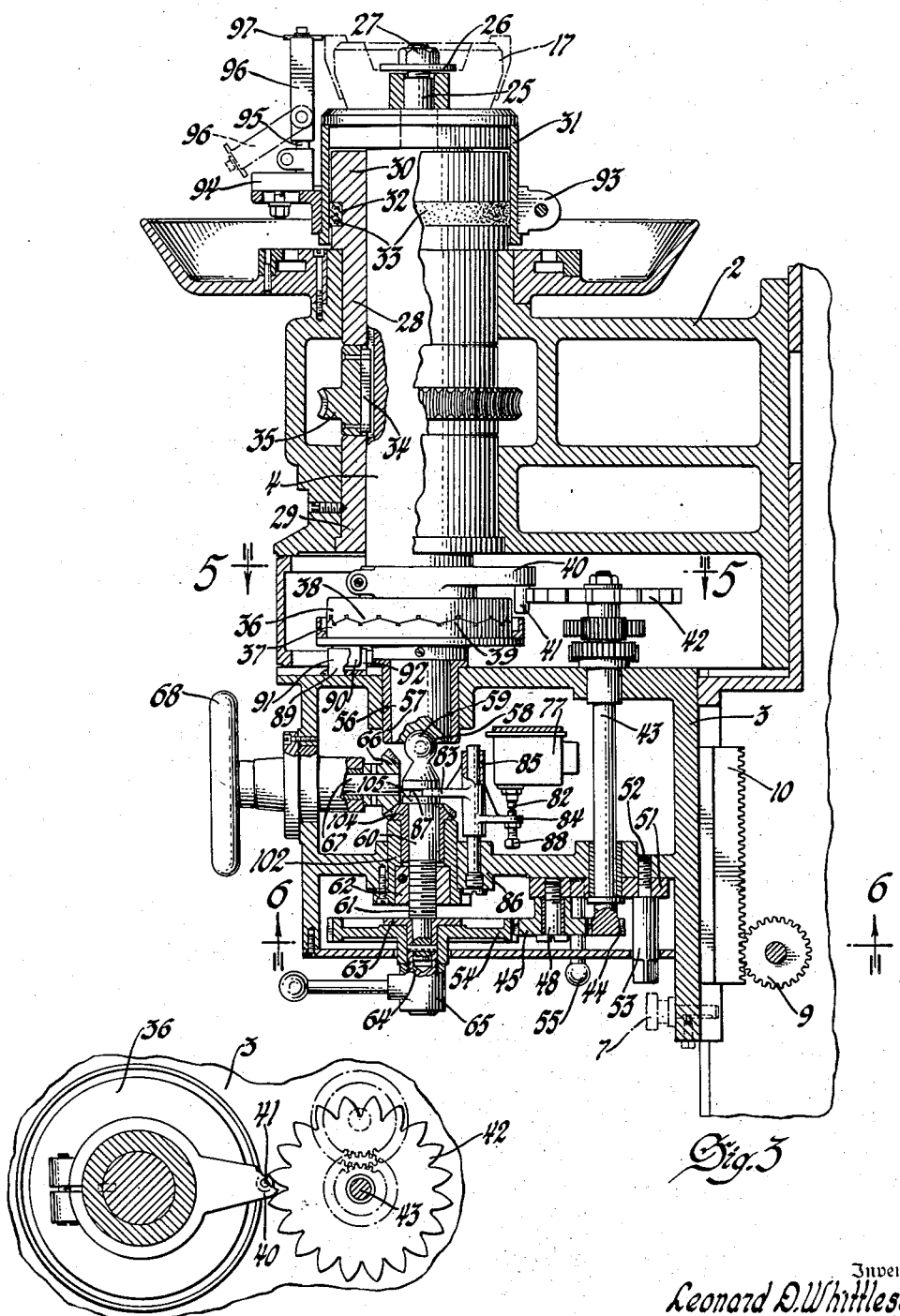
Figure 3 is an enlarged sectional view taken substantially on line 3—3 of Figure 1, portions of certain parts being shown in elevation.

Referring to Figure 3, the spindle 4 is cylindrical in shape and is provided at its upper end with means such as an integral stud 25, washer 26 and nut 27 for securing the milling cutter 17 or other work piece thereto. The body portion of the spindle is journaled in upper and lower bushings 28 and 29, the former of which may have a thick walled upper portion 30 which extends above and shoulders on the top of the upper housing 2. Enclosing this upwardly extending portion 30 is a dust shield in the form of an inverted cup 31 which is keyed to rotate with the spindle. The outer cylindrical surface of the bushing portion 30 is provided with an annular groove 32 in which is disposed a sealing element 33. Between the bushings 28 and 29 and in driving engagement with the spindle 4 as through the key member 34 is a worm wheel 35, through which the spindle may slidably reciprocate and by means of which the spindle is continuously rotated during operation of the machine to the lower end of the spindle 4, below the lower bushing 29, is fixed an annular follower plate 36 which rides on a relatively fixed cam 37 supported by the lower housing 3. The follower plate 36 and the cam 37 are provided with equally spaced lobes 38 and 39, respectively, of uniform contour, the number of lobes on each being the same as the number of teeth on the milling cutter 17 being ground.

Figure 2:
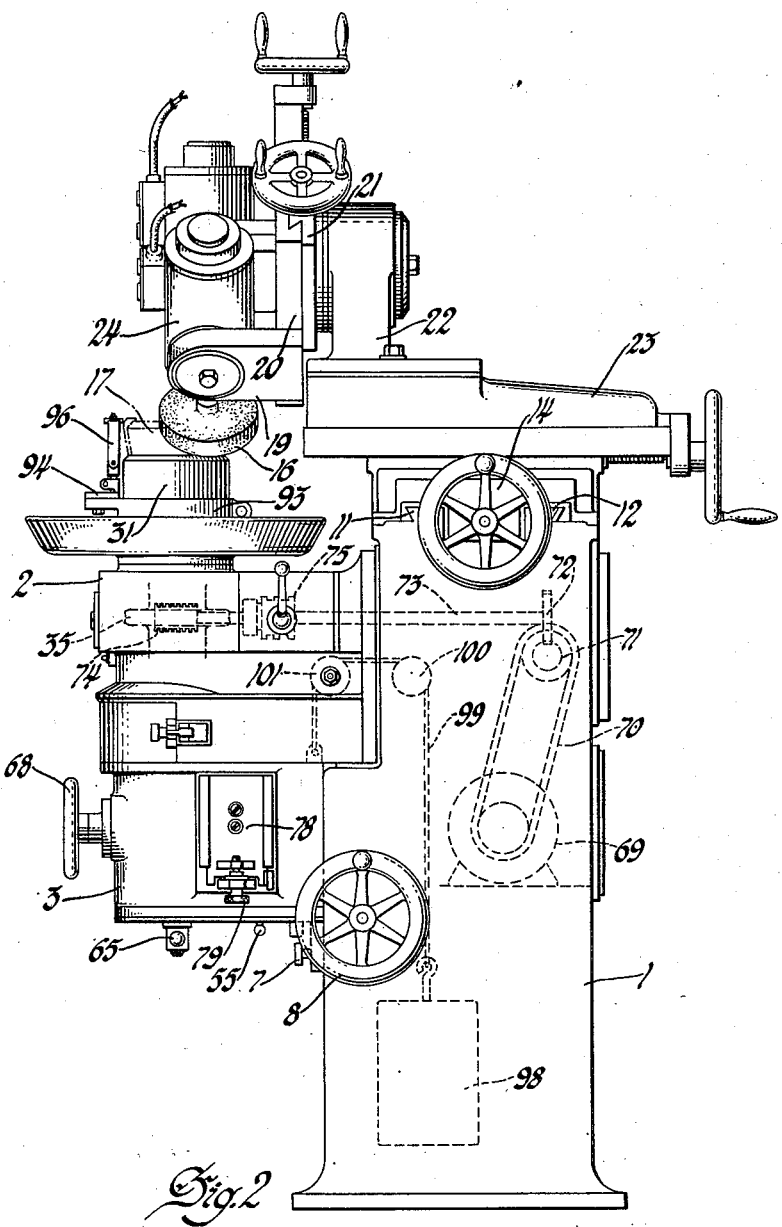
Figure 2 is a side elevational view thereof, taken from the right of the view shown in Figure 1.
Figure 4:
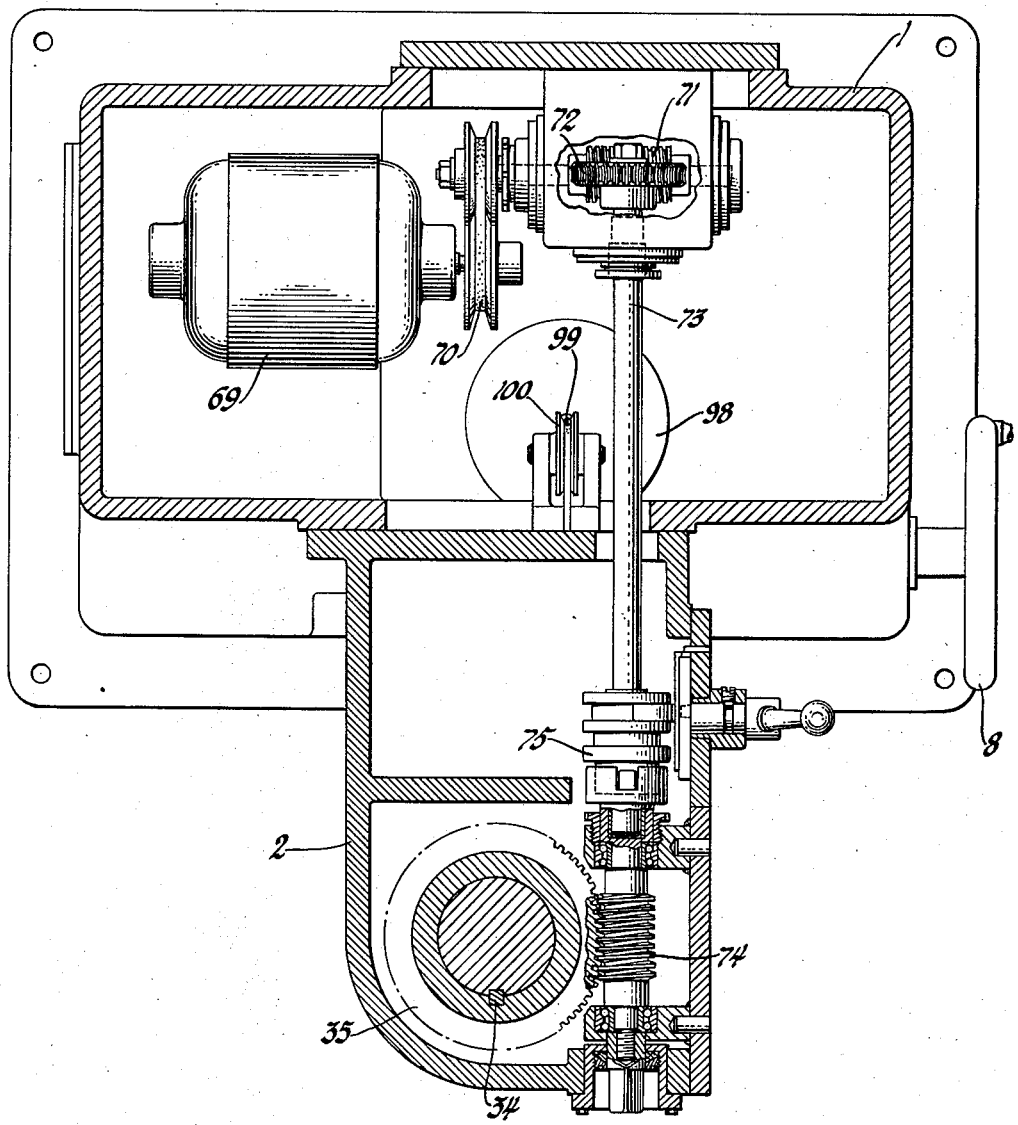
Figure 4 is an enlarged sectional view taken substantially on line 4—4 of Figure 1.

As indicated in outline in Figure 2 and shown in plan in Figure 4, an electric motor and primary speed reduction gearing may be conveniently enclosed within the machine base 1. The arrangement comprises a reversible electric motor 69 drivingly connected to the shaft of a worm 71 through a belt 70. In mesh with worm 71 is a worm wheel 72 on shaft 73 which extends into the upper housing 2, wherein it may be directly connected through a sliding jaw clutch 75 with a worm 74 in mesh with the worm wheel 35 on the spindle.

Secured to rotate with the spindle 4 as by means of the arm 40 clamped to the follower plate 36 is a feed dog 41 which engages a star wheel 42 (see Figure 5) and rotates the latter an increment of one tooth per each revolution of the spindle 4. A shaft 43 which is driven by the star wheel 42 is journaled in the lower housing 3 and at its lower end carries a drive pinion 44 which is in constant mesh with both a large idler pinion 45 and a small idler pinion 46 (see Figure 6), which latter in turn is in constant mesh with a second idler pinion 47. The idler pinions 45, 46 and 47 are each journaled on respective pins 48, 49 and 50 secured to a shift plate 51 which is journaled on the shaft 43 and is provided with an arcuate slot 52 through which extends the shank of a clamping bolt 53 threaded in the lower housing 3. The slot 52 is disposed on a radius from the axis of the shaft 43 and is of such length and location that the bolt 53 serves to limit the two extreme positions of the shift plate to provide for readily meshing either the large idler pinion 45 or the small second idler pinion 47 with the driven gear 54. The feed drive through the pinion 47 is used during grinding of a left-hand cutter, when the direction of spindle rotation is reversed. A handle 55 secured to the shift plate is provided for moving the same in making shifts.

The cam 37 is supported on a tappet 56 which is freely movable vertically in a bushing 57 fixed in the lower housing 3. The bottom end of the tappet 56 is provided with a spherical seating surface 58 which rides on the ball-shaped upper end 59 of the feed screw 60. This feed screw is provided with a section 61 threadedly engaging a nut 62 held against rotation in a bushing 102 fixed in the lower housing 3, and at its lower end carries a clutch disc 63 having a downwardly extending shank portion 64 upon which the driven gear 54 is journaled. A clamping nut 65 threaded on the lower end of the shank portion 64 supports the gear 54 thereon, and when run up on the shank threads operates to clamp the gear 54 in driving engagement with the disc 63. Keyed to the feed screw 60 is a bevel gear 104 which journals in the upper end of the bushing 102 and is in constant meshing engagement with a second bevel gear 66 secured to a shaft 67 which journals in the lower housing 3 and is provided externally thereof with a hand wheel 68. Downward travel of the feed screw 60 is limited by the shoulder 105 thereon, coming into contact with the gear 104 which is vertically supported by the bushing 102.

Means are required to prevent the cam 37 from turning with the follower plate 36 during rotation of the latter with the spindle 4. Such means, as best shown in Figure 7, may conveniently take the form of a dog 90 secured to the underside of the cam 37 and slidably embraced between arms 91 and 92 of a U-shaped member 89 secured to the lower housing 3. The dog 90 and arms 91 and 92 must overlap each other a sufficient distance vertically to insure their interengagement through the maximum limit of travel of the feed screw 60.

The motor 69 which drives the spindle is manually controllable through a switch 76 of conventional form, having "forward," "reverse" and "stop" buttons. In addition, to provide for selectively pre-setting the total depth of grind to be taken on a milling cutter, an automatic cut-off switch 77 is installed in the electrical circuit so as to over-ride the control of the manual switch 76 in both its "forward" and "reverse" settings. This cut-off switch is mounted on a plate 78 (see Figure 8) which is slidable vertically on one side of the lower housing 3. A feed setting screw 79 which is longitudinally anchored to the lower housing 3 threadedly engages the plate 78 for raising and lowering the latter. Operation of the cut-off switch to stop the spindle drive is effected upon upward movement of its control button 82 through means movable with the spindle feed screw 60. As shown in Figure 3 such means may consist of a sleeve member 85 vertically slidable on a guide 86 secured in the lower housing 3 and provided with two transversely extending arms 83 and 84, of which the former engages an annular groove 87 in the feed screw 60 between the shoulder 105 and the ball end 59 thereon, and arm 84 carries a vertically adjustable pin or screw 88 below and in alignment with the control button 82. A graduated dial 80 carried by the feed setting screw 79 and a vertical scale 81 attached to the switch plate 78 are provided for adjusting the height of the cut-off switch with reference to fixed markings on the lower housing 3. The screw 88 should preferably be set at the precise height which holds the cut-off switch in the "power off" position while the switch plate 78 is at its "zero" position as indicated by the dial 80 and scale 81 and while the feed screw 60 is at "bottom" position (shoulder 105 thereon abutting gear 104). Total feed depths for the work spindle may then be pre-selected by adjusting the feed setting screw 79.

To enable installing and grinding successive milling cutters of the same size and design without having to re-position the grinding wheels 15 and 16, means are provided for locating the milling cutter angularly about the axis of the spindle with reference to the lobes 38 on the follower plate 36. As best shown in Figure 3, such means may consist simply of a clamp 93 angularly adjustable on the spindle dust shield 31 and carrying an L-shaped bracket 94 which is adjustable radially of the spindle 4. Supported by and adjustable vertically of the bracket 94 is a post 95, to which is hinged an arm 96 carrying a pointer 97 at its outer end. Through the various adjustments which can be made in it position with reference to the spindle the pointer 97 can be located at any desired point with reference to any one of the teeth on a particular milling cutter for which the grinding wheels 15 and 16 have been set up. The arm 96 is then swung outward out of position as shown in broken lines in Figure 3 where it is carried during the grinding operation, and from whence it may be readily swung into position for use in similarly locating subsequent milling cutters.

In the operation of the machine, a milling cutter 17 is placed on the stud 25 at the top of the spindle 4 and angularly located with reference to the pointer 97, following which the nut 27 is tightened securely. Next, with the feed drive clamping nut 65 loosened, the feed screw 60 is run down to "bottom" position by rotation of the hand wheel 68, and the total depth of feed pre-selected by adjustment of the feed setting screw 79. The spindle drive motor 69 is then started and the grinding wheels 15 and 16 (which have previously been set at the proper clearance angles for the teeth of the milling cutter) are started rotating and brought down until they each just touch the teeth of the milling cutter at the top of the stroke of the spindle. The feed drive clamp nut 65 may then be tightened, after which the milling cutter will move upward a certain increment with each revolution thereof, while continuing to reciprocate with the spindle 4 as the follower plate 36 rides over the cam 37. The amount of each increment of feed per revolution of the cutter may be altered by substituting for the star wheel 42 another of lesser or greater number of teeth. With each successive up-stroke of the spindle different individual teeth on the milling cutter are moved into contact with the two grinding wheels, each tooth being ground to the same height at the end of each revolution of the spindle. When the pre-selected total depth of grind has been completed the screw 88 will have risen to move the cut-off switch control button 82, automatically stopping the spindle drive motor 69.

The direction of rotation of the spindle and the relative positioning of grinding wheels over the teeth of the milling cutter are preferably chosen such that the direction of grinding sweep is from the cutting edge towards the back of the teeth, thereby obtaining an improved quality of grind and eliminating any tendency to chip the tooth cutting edges.

We claim:

1. A machine for grinding the teeth of circular milling cutters and the like, comprising a rotatable and reciprocable work spindle for carrying a milling cutter to be ground, means for continuously rotating the spindle, means including a cam for causing the rotation of the spindle to effect a concurrent reciprocation thereof, means intermittently actuated by the spindle for shifting said cam longitudinally of the spindle axis, and abrasive means fixedly positioned longitudinally of the spindle for contacting successive teeth of the milling cutter with each reciprocation of the spindle.

2. In a grinding machine for sharpening a circular milling cutter or like work piece, a frame, a housing extending laterally therefrom, an axially rotatable and longitudinally reciprocable spindle mounted vertically in the housing, the upper end of the spindle having means for carrying the work piece and its lower end having a cam follower fixed thereto, a gear for rotatably driving the spindle and supported longitudinally thereof in the housing, a cam operative to lift the follower and movable longitudinally of the spindle axis, a feed screw connected to the cam for effecting its movement longitudinally of the spindle axis, and a gear train drivably connecting the spindle to the feed screw.

3. In a grinding machine for sharpening the teeth of circular milling cutters and the like, a spindle for supporting the milling cutter, means for effecting a continuous rotation of the spindle, cam means for effecting a longitudinal reciprocation of the spindle in timed relation with its rotation, the frequency of the reciprocations per revolution of the spindle being equal to the number of teeth on the milling cutter to be sharpened, an axially rotatable grinding wheel fixedly mounted to be contacted by successive teeth of the milling cutter near one end of the reciprocatory stroke of the spindle, and feed means geared to the spindle for advancing its reciprocatory stroke toward the grinding wheel a predetermined distance upon completion of each revolution of the spindle.

4. In a grinding machine for sharpening circular milling cutters and the like, a grinding wheel, a spindle for supporting the milling cutter with one of its cutting surfaces opposite the grinding wheel, means for continuously rotating the spindle to effect a continuous indexing of the milling cutter relative to the grinding wheel, cam means effective upon rotation of the spindle for reciprocating the milling cutter to bring successive cutting surfaces thereon into and out of contact with the grinding wheel as the cutter is rotated relative thereto by the spindle, and a feed screw connected to the cam means and arranged to successively advance the reciprocatory stroke of the spindle an incremental distance toward the grinding wheel with each revolution of the spindle.

5. In a machine for grinding the cutting teeth of circular milling cutters and the like, a grinding wheel, means for continuously reciprocating the milling cutter to move respective teeth thereof into and out of contact with the grinding wheel, means for continuously rotating the cutter to index successive cutting teeth into position to contact the grinding wheel in timed relation with the reciprocation of the cutter, feed means geared to the cutter rotating means for advancing the reciprocating means a predetermined distance toward the grinding wheel at the end of each revolution of the cutter, and adjustable means connected to the feed means for stopping the operation of the machine after a total predetermined advancement of the reciprocating means.

6. A machine for grinding the teeth of circular milling cutters and the like, comprising a vertical work spindle for carrying the milling cutter to be ground, gearing connected to the spindle for rotatively driving the same, a cam follower fixed to and rotatable with the spindle, said follower consisting of a plate with a plurality of equally spaced and downwardly extending uniform lobes equal in number to the number of teeth on the milling cutter to be ground, a cam plate in operative engagement with and fixedly supported relative to the follower plate and provided with upwardly extending lobes of the same form and number as the lobes on the follower plate, feed means for raising the cam plate a predetermined distance at the end of each revolution of the spindle, and abrasive means fixedly positioned longitudinally of the spindle to contact successive teeth of the milling cutter with each reciprocation of the spindle.

7. A machine for grinding the teeth of circular milling cutters and the like, comprising a rotatable and reciprocable work spindle for carrying a milling cutter to be ground, means for continuously rotating the spindle, a cam follower fixed to the spindle, a cam having an annular track on which the follower travels, said track being formed of equally spaced uniform lobes equal in number to the number of teeth on the milling cutter and projecting longitudinally of the spindle, feed means connected to the cam for moving the cam longitudinally of the spindle a predetermined extent at the end of each revolution of the spindle, grinding wheels fixedly mounted offset from the axis of the spindle in positions to be contacted by the faces and outer ends respectively of successive teeth on the milling cutter when the cam follower is at a position of maximum rise with respect to the cam.

8. A grinding machine for sharpening the teeth of circular milling cutters and the like, comprising a spindle having means at one end thereof for fixedly mounting the milling cutter to be ground, drive means connected to the spindle for effecting a continuous rotation of the cutter, a cam follower fixed to the opposite end of the spindle, a cam in operative engagement with the follower and immovable relative thereto for effecting a continuous reciprocation of the cutter, grinding wheels adjustably positioned to contact the faces and chamfered ends respectively of successive teeth of the rotating milling cutter at one end of the reciprocatory stroke of the cutter, a feed screw operatively connected to the cam for advancing the same toward the grinding wheels, a gear train drivably connected to the feed screw, and an arm extending transversely of the spindle and secured to rotate therewith about the spindle axis, said arm being adapted to engage and effect a partial rotative movement of one of the gears in said gear train at the end of each revolution of the spindle.

9. In a grinding machine, a frame, a housing extending laterally therefrom, a vertical spindle journaled in the housing and provided at its upper end with means for carrying a circular milling cutter, a gear for rotatably driving the spindle and supported longitudinally thereof in the housing, a power supply for driving the gear, a cam follower fixed to the spindle below the gear, a cam supporting the follower and locked against rotation relative to the housing, a feed screw vertically supporting the cam and in threaded engagement with a nut fixedly mounted below the housing, means for automatically advancing the feed screw through the nut a predetermined amount at the end of each revolution of the spindle to raise the cam and thereby raise the reciprocatory stroke of the spindle, means for stopping the power supply, and a member advanced by the feed screw for actuating the power supply stopping means.

10. In a grinding machine, a spindle having means at one end for fixedly securing a circular milling cutter, drive means connected to the spindle for effecting its continuous rotation, an annular cam axially aligned with the spindle and locked against rotation therewith, a cam follower in operative engagement with the cam and fixed to the spindle, a feed screw supporting the cam longitudinally of the axis of the spindle, a gear train for driving the feed screw, and an abrasive member fixedly positioned relative to the spindle for contacting successive teeth of the milling cutter with each rise of the follower on the cam.

11. In a grinding machine for sharpening the teeth of circular milling cutters and the like, a spindle having means at one end thereof for fixedly mounting a cutter, drive means including an electric motor for effecting a continuous rotation of the spindle, a cam follower fixed to the opposite end of the spindle, a cam in operative engagement with the follower for effecting a continuous reciprocation of the spindle during rotation of the spindle, feed means operably responsive to spindle rotation for advancing the cam along the longitudinal axis of the spindle and thereby advancing the reciprocatory stroke of the spindle, an electrical switch for stopping the motor, a member actuated by the feed means for opening the switch after a predetermined total advancement of the spindle stroke, and adjusting means for movably positioning the switch relative to feed actuated member.

12. A machine for grinding the teeth of circular milling cutters and the like, comprising a work spindle adapted to carry the milling cutter to be ground, means for imparting a continuous axial rotation and a continuous longitudinal reciprocation to the spindle, means operably responsive to spindle rotation at the end of each revolution of the spindle to shift the reciprocatory stroke of the spindle a predetermined amount, and an abrasive member fixedly positioned relative to the longitudinal movements of the spindle for contacting successive teeth of the milling cutter with each reciprocation of the spindle.

13. A machine for grinding the teeth of circular milling cutters and the like, comprising a rotatable and reciprocable work spindle having means adjacent one of its ends for attaching a milling cutter, driving means for continuously rotating the spindle, means for effecting reciprocation of the spindle in timed relation with its rotating movement, means geared to the spindle for effecting a predetermined longitudinal advancement of the spindle reciprocatory stroke with each revolution of the spindle, and abrasive means fixedly positioned with respect to the longitudinal movements of the spindle so as to contact successive teeth of the milling cutter with each reciprocation of the spindle.

LEONARD D. WHITTLESEY.
OSCAR L. STRAND.

REFERENCES CITED

The following references are of record in the file of this patent:

UNITED STATES PATENTS

| Number | Name | Date |
|---|---|---|
| 1,324,992 | Arter | Dec. 16, 1919 |
| 1,491,922 | Rockwell | Apr. 29, 1924 |
| 1,841,244 | Gstyr | Jan. 12, 1932 |
| 2,124,990 | Sykes | July 26, 1938 |
| 2,188,005 | Johanson | Jan. 23, 1940 |
| 2,332,420 | Wildhaber | Oct. 19, 1943 |

FOREIGN PATENTS

| Number | Country | Date |
|---|---|---|
| 370,648 | Germany | Mar. 5, 1923 |